No. 633,115. Patented Sept. 19, 1899.
H. K. BORCHGREVINK.
MILK PAIL.
(Application filed Oct. 7, 1898.)

(No Model.)

Witnesses:
Geo. W. Young.
B. C. Roloff

Inventor:
Henrick K. Borchgrevink
By H. G. Underwood
Attorney

THE NORRIS PETERS CO., PHOTO-LITHO., WASHINGTON, D. C.

UNITED STATES PATENT OFFICE.

HENRICK K. BORCHGREVINK, OF RACINE, WISCONSIN, ASSIGNOR OF ONE-HALF TO JOHN F. JOHNSON, OF SAME PLACE.

MILK-PAIL.

SPECIFICATION forming part of Letters Patent No. 633,115, dated September 19, 1899.

Application filed October 7, 1898. Serial No. 692,875. (No model.)

*To all whom it may concern:*

Be it known that I, HENRICK K. BORCHGREVINK, a subject of the King of Sweden and Norway, and a resident of Racine, in the county of Racine and State of Wisconsin, have invented certain new and useful Improvements in Milk-Pails; and I do hereby declare that the following is a full, clear, and exact description thereof.

My invention relates to that class of milk-pails designed to receive the milk from the cow while the operation of milking is being performed; and it consists in certain peculiarities of construction and combination of parts, as will be fully set forth hereinafter and subsequently claimed.

Figure 1:
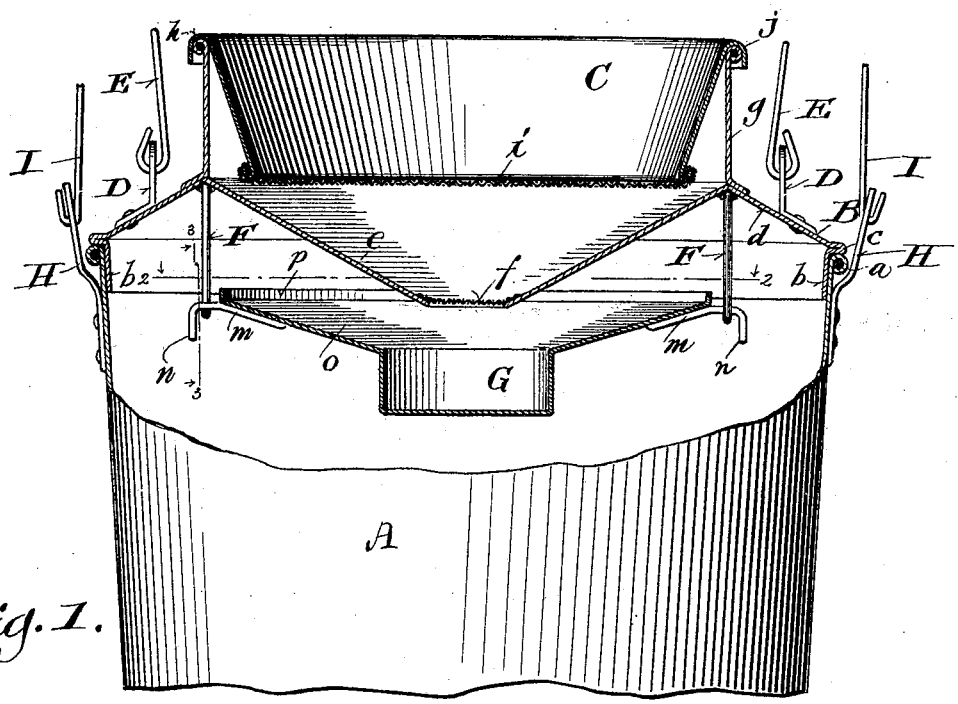
Figure 2:
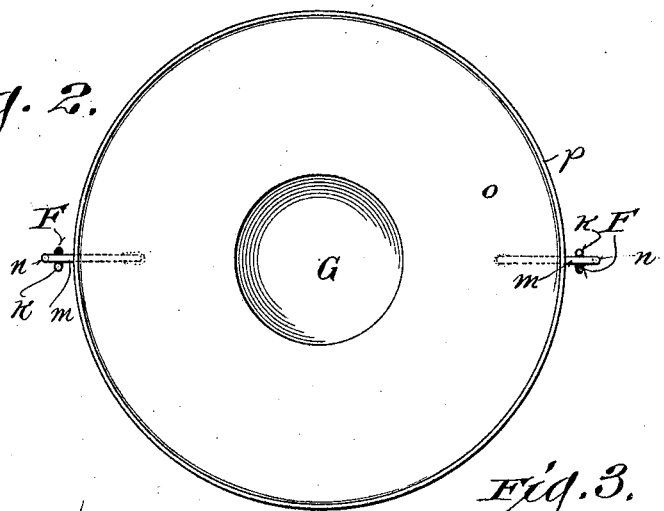
Figure 3:
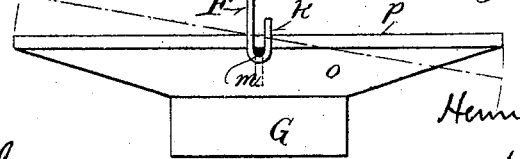

In the drawings, Figure 1 is a partly-sectional view of the upper parts of one of my improved milk-pails. Fig. 2 is a plan view of the suspended dirt-collecting cup and milk cooler and aerator, looking downward from the line 2 2 of Fig. 1. Fig. 3 is a detail side elevation of said last-named part, looking toward the center from the line 3 3 of Fig. 1.

One serious objection to milk that is collected in ordinary open-topped pails or buckets is the amount of dirt and refuse matter that falls into the pail at the time of milking, and to remedy this fault, as well as to cool or aerate the milk at the time, I have devised my present invention.

Referring to the drawings, A represents the pail or receptacle for the milk, which may be of sheet metal, if preferred, with a rolled and strengthened upper edge $a$, as shown.

B represents the top of the pail, comprising an annular flange $b$, fitting just within the top of the pail, united, as by a bead $c$, (which rests on the top of the edge $a$,) to an obliquely-disposed upward and inward projecting flat ring $d$, which in turn is united to a downward-projecting obliquely-disposed flat ring $e$, which inclines all around toward the center in the shape of an inverted truncated cone or funnel top, the central hole being fitted with a sieve or screen, preferably a wire sieve $f$. I have shown these parts $b\ c\ d\ e$ as if they were all pressed or stamped out of a single piece of sheet metal; but if preferred they may be made of separate pieces or strips soldered or seamed together. A vertical band or collar $g$ is soldered or otherwise secured to the described top just about the junction of the rings $d\ e$ and preferably has an upper rolled, seamed, or beaded edge $h$, which may be stiffened with a wire, as shown, if desired.

C represents a sieve or strainer formed of an inclined annular strip of sheet metal with a wire-screen bottom $i$, and having its upper edge preferably bent over outwardly, as shown at $j$, so as to fit over the rolled top $h$ of the collar $g$.

D D are ears riveted or otherwise secured to the part $d$ of the top for the reception of the ends of the bail E.

F F are hangers, preferably of wire, secured opposite each other, as by solder, to the under side of the top B and having, preferably, open-hooked lower ends, as best shown at $k$, Fig. 3, for the reception of pintles or trunnions $m\ m$, which have preferably downturned ends $n\ n$ and which project opposite to each other from the edge of the annular oblique band $o$. This band is in the shape of an inverted truncated cone or funnel top also; but its central opening is united to a cup G instead of to a screen-section, and the upper annular edge of the band $o$ is preferably formed with a vertical edge $p$. H I are the ears and bail on the pail A.

The operation of my device will be readily understood from the foregoing description of its construction, taken in connection with the accompanying drawings. The pail is preferably held between the knees of the milker in the usual way—that is, tilted or inclined toward the animal—and the milk is directed within the sieve C, striking and passing through the screen-bottom $i$, without spattering, and falling within the conical part $e$ of the top B and through the lower central screen $f$ thereof into the suspended flanged cup G $o$ and over the edge thereof into the pail A. By reason of the described manner of suspending the said cup G $o$ the latter always remains in a horizontal position irrespective of the angle to which the pail has been tilted, and the milk after passing through the two screens named escapes over the edge $p$ of the cup in a clean pure condition, the small heavier particles of dirt which have passed the screens dropping into the cup G and the lighter of the said small particles being arrested by the described edge $p$ of the suspended device G $o$ as the milk flows over and gradually settling back into the cup G, the said milk being further cooled and aerated in its described passage. The amount of dirt, hair, and other refuse matter which is thus arrested and kept out of the milk is astonishing, and the milk does not require filtering before use.

The several parts of my device may be very readily taken apart for cleansing and the removal of the dirt and other refuse substance collected thereby. The sieve or screen C can be quickly slipped from the top B and the latter from the pail A, and to remove the dirt-cup and aerator G $o$ it is only necessary to push the latter upward to free it from the hooked ends of the hangers F F, to which position it can be quickly restored by a turn of the wrist, as the said hooked ends of the hangers are preferably on opposite sides thereof.

Having thus described my invention, what I claim as new, and desire to secure by Letters Patent, is—

1. In a milk-pail, the combination with a closed funnel-shaped top projecting downward into the pail, and having a screen in its central bottom portion, of hangers projecting downward from said top on each side of said central portion, and a dirt-collecting cup, pivoted to said hangers and swinging free from contact with the pail or top so as to always maintain a horizontal position.

2. In a milk-pail, the combination with a closed top provided with a screen in the bottom portion thereof, of a dirt-collecting cup pivotally suspended from said top so as to always maintain a horizontal position, and having an annular inclined flange for cooling and aerating the milk as it flows over the edge thereof, substantially as set forth.

3. In a milk-pail, the combination with a closed funnel-shaped top, provided with a screen in the bottom thereof, of a band or collar rising above said top, a removable sieve or screen supported by said band or collar, and a flanged dirt-collecting and milk-cooling cup pivotally suspended from the under side of said top, substantially as set forth.

4. In a milk-pail, the combination with a funnel-shaped top adapted to tightly close said pail and projecting downward into the pail, a screen in the bottom of said pail-top, a continuous closed band or collar rising from said pail-top, and a removable sieve or screen suspended from said band or collar, the upper edge of the frame of said screen making a close fit with the top edge of said band or collar.

In testimony that I claim the foregoing I have hereunto set my hand, at Racine, in the county of Racine and State of Wisconsin, in the presence of two witnesses.

HENRICK K. BORCHGREVINK.

Witnesses:
WILLARD B. OVERSON,
MRS. C. A. WEED.